Aug. 9, 1960

R. EPAIN ET AL 2,948,556

PACKING DEVICES FOR NEEDLE VALVES

Filed April 29, 1958

INVENTOR
RAYMOND EPAIN
PIERRE JOHANNIN
BORIS VODAR

BY Larson and Taylor
ATTORNEY

UNITED STATES PATENT OFFICE 2,948,556
Patented Aug. 9, 1960

2,948,556

PACKING DEVICES FOR NEEDLE VALVES

Raymond Epain, Paris, Pierre Johannin, Bellevue, and Boris Vodar, Paris, France, assignors to Centre National de la Recherche Scientifique, Paris, France, a society of France Filed Apr. 29, 1958, Ser. No. 731,701

Claims priority, application France May 2, 1957

3 Claims. (Cl. 286—26)

The present invention relates to valves of the type including a rod slidable in a chamber provided in the valve body. In such valves it is of course necessary to provide a packing device between said rod and the inner wall of said chamber.

Said packing device includes a packing member housed in said chamber and tightly surrounding said rod. As it is practically impossible to be sure that not even a small amount of fluid under pressure will leak between said rod and said packing member, it is necessary to provide a packing member extending a considerable length along said rod so that possible leaks will be limited by the gradual drop of the pressure of the fluid leaking along said packing member.

In view of the resulting great area of contact between the valve rod and the packing member applied with a great pressure around it, a very high friction must be overcome when it is desired to move the valve rod with respect to the packing member. As a consequence, when the fluid to be controlled is at very high pressure, a person operating such a valve has to exert such a force on the valve rod that he is no longer able to feel when the valve needle is tightly applied on its seat and he is apt to exert too great an effort, which will deteriorate either the valve needle or the valve seat, or even both.

The object of our invention is to obviate this drawback.

For this purpose, we make use of a packing device, which will be hereinafter described in detailed fashion, having the property that the force with which the packing member is applied against the valve rod is automatically greater than the pressure of the fluid in the valve chamber, irrespective of the value of said pressure.

With such a packing device, no fluid can leak past the packing member and it is therefore possible to reduce the length (or thickness) thereof. Consequently the frictional force to be overcome when operating the valve rod is correspondingly reduced and it is possible to feel exactly when the valve needle is applied upon its seat, whereby any danger of injuring the valve elements by exerting too great an effort on the valve rod can easily be avoided.

A preferred embodiment of our invention will be hereinafter described with reference to the accompanying drawings, given merely by way of example and in which.

Figure 1:
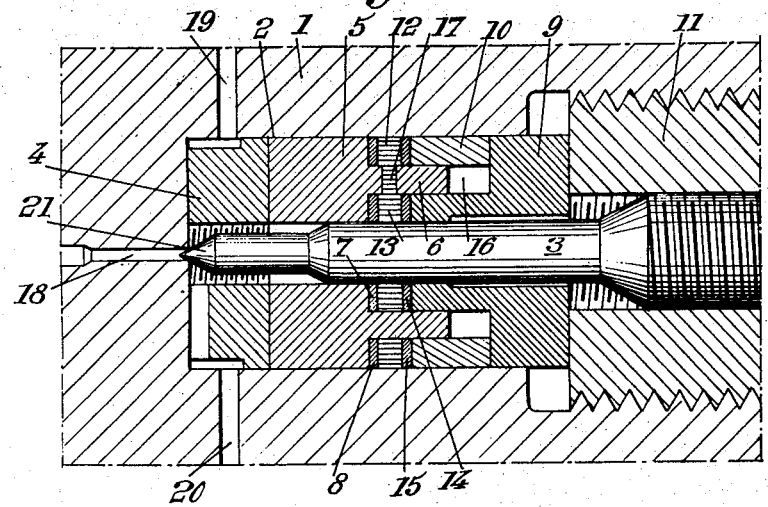
Fig. 1 is a longitudinal sectional view of a packing device made according to an embodiment of our invention.

Fig. 1 shows a valve body 1 forming a cylindrical chamber 2 along the axis of which is mounted a control rod 3 the end 21 of which forms a needle adapted to cooperate with the end of a passage 18 opening into chamber 2 and the outlet of which constitutes a seat for said needle 21. Passage 18 is in communication with a chamber containing a fluid at a pressure higher than atmospheric pressure. This fluid under pressure is to escape, when needle 21 is not applied upon its seat, through passages 19 and 20 starting from chamber 2.

A packing device is provided to prevent the fluid in chamber 2 from leaking out between rod 3 and the inner wall of chamber 2. This packing device is applied against a ring 4 itself in contact with the end wall of chamber 2 into which opens passage 18.

The packing device includes an annular member 5 having a flat end face in contact with ring 4. The other end face of said member 5 is T-shaped in half section by an axial plane so as to include a cylindrical annular extension 6 located between two concentric annular shoulders 7 and 8. Another annular unit located opposite member 5 is constituted by two pieces 9 and 10. Piece 9, the half section of which by an axial plane is L-shaped, has an annular flat face in contact with a threaded ring 11 screwed in body 1. The other end of piece 9 forms a tubular extension adapted to engage with a sliding fit between rod 3 and the extension 6 of annular member 5. Piece 10 is a hollow cylinder one base of which is applied against piece 9 and which engages with a sliding fit between the extension 6 of annular member 5 and the cylindrical wall of chamber 2. Between the shoulders 7 and 8 of annular member 5 and pieces 9 and 10 which constitute the second annular unit, are housed two annular packings 12 and 13. Each of these packings, which may be either simple or composite, is constituted by one or several rings of a material which is plastic at the pressure of utilization, such as lead, rubber, Teflon and the like.

In order to prevent this material from leaking out from said housings, we may interpose between the packings and annular members 5, 9 and 10 rings such as 14 and 15 of copper or another malleable metal. These rings are for instance 0.5 mm. thick. Between annular member 5 and piece 9, there is left an empty space 16 which is in communication with the atmosphere. Preferably, holes 17 provided in extension 6 ensure equality of the pressures to which packings 12 and 13 are subjected respectively. Advantageously, these holes 17 are filled with a plastic material such as lead. The number of these holes is for instance eight and their diameter 1 mm.

Rod 3 and parts 5, 9 and 10 are carefully rectified, same as the inner wall of chamber 2, in order to permit relative sliding of these elements.

Figure 2:
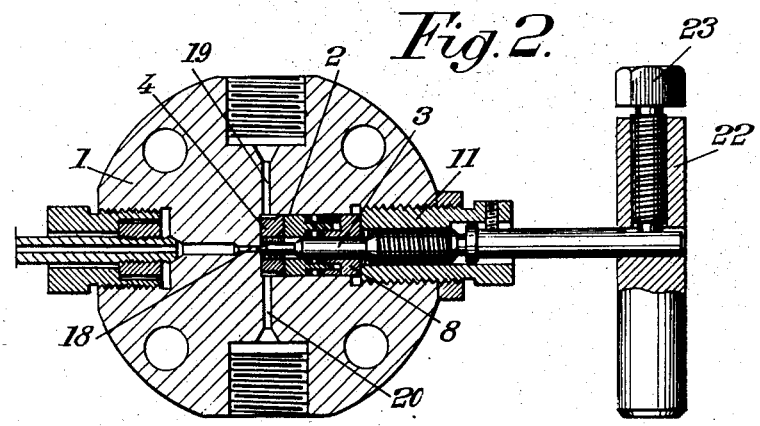
Fig. 2 is a view on a smaller scale of a valve provided with a packing device according to our invention.
Figure 3:
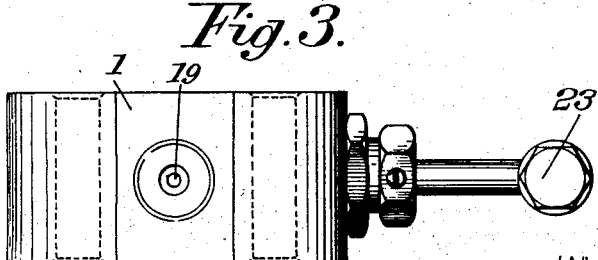
Fig. 3 is a top plan view corresponding to Fig. 2.

Fig. 2 shows the arrangement of a valve making use of a packing device as shown by Fig. 1. The fluid under pressure is fed through passage 18 to the valve seat; it passes through grooves provided in ring 4 so as to be able to flow out through passages 19 and 20. Rod 3 is controlled by a handle 22 fixed thereon by a screw 23, a portion of said rod 3 being screwed in ring 11 itself screwed in the body 1 of the valve. This ring 11 serves to exert a thrust on piece 9 toward the left.

If: S is the area of the left end face of member 5, s the sum of the areas of annular shoulders 7 and 8, p the pressure of the fluid and p' the pressure in packings 12 and 13 and if the atmospheric pressure is taken equal to 1, the relation expressing that the forces acting on piece 5 balance one another is:

$$pS = p's + S - s$$

This may be written:

$$p(S-s) + ps = p's + S - s$$

or:

$$(p'-p)s = p(S-s) - (S-s)$$

and finally:

$$(p'-p)s = (p-1)(S-s)$$

This last relation showed that the pressure $p'$ in packings 12 and 13 is always higher than the pressure $p$ of the fluid fed from conduit 18 provided that $p$ is itself higher than 1, that is to say higher than atmospheric pressure.

As a consequence of this, the thickness of packings 12 and 13 may be very small, for instance ranging from 0.5 mm. to 1 mm., for very high values of pressure $p$, for instance 1,500 atmospheres.

The frictional forces opposing the movements of rod 3 are therefore relatively small and it is possible to screw said rod in ring 11 to apply needle 21 against its seat without risk of deteriorating said needle and said seat.

It should be noted that this packing device requires that parts 5, 9 and 10 be mounted so that they can slide with respect to both rod 3 and chamber 2. A very slight play is therefore necessary but this play must be reduced to a minimum in order to prevent the matter of the packings from leaking between parts 9 and 10 and parts 3 and 2.

In a general manner, while we have in the above description disclosed what we deem to be a practical and efficient embodiment of our invention, it should be well understood that we do not wish to be limited thereto as there might be changes made in the arrangement, disposition and form of the parts without departing from the principle of the present invention as comprehended within the scope of the accompanying claims.

What we claim is:

1. For use in connection with a needle valve, a body forming a cylindrical chamber having one end wall, said body containing a fluid under pressure higher than atmospheric pressure, a rod guided in said chamber coaxially therewith, a packing device for said rod which comprises, in combination, a rigid annular member interposed between said rod and the cylindrical wall of said chamber and having one end face that adjoins said end wall of the chamber at a fixed distance therefrom said annular member fitting slidably on said rod and said cylindrical wall, the other end face of said annular member including three coaxial annular areas, an outer one adjoining said chamber cylindrical wall, an inner one adjoining said rod, and an intermediate one, with two coaxial cylindrical surfaces extending respectively between the inner periphery of said outer area and the outer periphery of said intermediate area and between the inner periphery of said intermediate area and the outer periphery of said inner area, said intermediate area being at a greater distance from said chamber end wall than either of said inner and outer areas, a rigid annular unit interposed between said rod and the cylindrical wall of said chamber and located opposite the other end face of said annular member, the end face of said annular unit turned toward said annular member including three coaxial annular areas, an outer one adjoining said chamber cylindrical wall, an inner one adjoining said rod, and an intermediate one, with two coaxial cylindrical surfaces extending respectively between the inner periphery of said last mentioned outer area and the outer periphery of said last mentioned intermediate area and between the inner periphery of said last mentioned intermediate area and the outer periphery of said last mentioned inner area, said two last mentioned cylindrical surfaces being dimensioned to cooperate with a sliding fit with said two first mentioned cylindrical surfaces respectively, said last mentioned intermedate area being at a greater distance from said chamber end wall than either of the two other last mentioned areas, two annular plastic packings interposed respectively between said two outer areas and between said two inner areas, and means mounted in said body for exerting a thrust on said annular unit toward said annular member to compress both of said packings, said intermediate areas being so positioned as to be at a distance from each other when both of said packings are compressed, the space between said two intermediate areas being in communication with the atmosphere.

2. A packing device according to claim 1 further including holes provided in said annular member to connect said two packings with each other and make the pressures therein equal to each other.

3. A packing device according to claim 1 in which said first mentioned inner and outer areas are located both in the same plane at right angles to said rod and said second mentioned inner and outer areas are located both in another plane at right angles to said rod.

References Cited in the file of this patent

UNITED STATES PATENTS

| | | |
|---|---|---|
| 2,097,943 | Zagorski | Nov. 2, 1937 |
| 2,586,871 | Shields | Feb. 26, 1952 |
| 2,744,775 | Bredtschneider | May 8, 1956 |

FOREIGN PATENTS

| | | |
|---|---|---|
| 558,431 | France | of 1923 |
| 835,098 | Germany | of 1952 |